United States Patent [19]
Shinozaki

[11] Patent Number: 6,119,077
[45] Date of Patent: Sep. 12, 2000

[54] TRANSLATION MACHINE WITH FORMAT CONTROL

[75] Inventor: Naoko Shinozaki, Nara, Japan

[73] Assignee: Sharp Kasbushiki Kaisha, Osaka, Japan

[21] Appl. No.: 08/796,735

[22] Filed: Feb. 6, 1997

[30] Foreign Application Priority Data

Mar. 21, 1996 [JP] Japan .................................. 8-064329

[51] Int. Cl.[7] .................................................. G06F 17/28
[52] U.S. Cl. ............................................................ 704/3
[58] Field of Search ................................. 704/2, 3, 4, 5, 704/6, 7, 8, 536, 523

[56] References Cited

U.S. PATENT DOCUMENTS

| | | | |
|---|---|---|---|
| 4,599,612 | 7/1986 | Kaji et al. ........................ | 345/115 |
| 4,866,670 | 9/1989 | Adachin et al. ................. | 704/2 |
| 4,894,779 | 1/1990 | Suzuki et al. .................... | 704/3 |
| 5,091,876 | 2/1992 | Kumano et al. ................. | 704/3 |
| 5,241,624 | 8/1993 | Torres .............................. | 345/429 |
| 5,349,368 | 9/1994 | Takeda et al. ................... | 704/3 |
| 5,351,189 | 9/1994 | Doi et al. ......................... | 704/3 |
| 5,587,902 | 12/1996 | Kugimiya ......................... | 704/2 |
| 5,689,723 | 11/1997 | Lim et al. ......................... | 707/542 |
| 5,729,618 | 3/1998 | Fujisawa et al. ................. | 704/2 |

FOREIGN PATENT DOCUMENTS

5-108711   4/1993   Japan .

*Primary Examiner*—Vivian Chang
*Assistant Examiner*—Patrick N. Edouard

[57] ABSTRACT

An original text inputting portion inputs an original text into an original text storage portion and at the same time transfers it to a translating portion that in turn translates the received text referring to a dictionary in a dictionary portion and stores a resultant translation into a translation storage portion. A format inputting portion inputs a format for the original text and a format for the translation and a format storage portion stores the input formats therein. A synthesized information storage portion synthesizes the original text stored in the original text storage portion, the translation stored in the translation stored portion and the formats stored in the format storage portion and stores a synthesized result. An outputting portion outputs the synthesized result to an external device such as a printer, display and external storage.

8 Claims, 10 Drawing Sheets

FIG.1
(PRIOR ART)

(1) EXAMPLE OF DISPLAYING TRANSLATION SIDE BY SIDE WITH THE ORIGINALS IN THE LEFT:

| ABC park is located in the center of New York. | ABC公園は、ニューヨークの中心に位置しています。 |
|---|---|
| I met her in the park. | 私は、公園で彼女に会いました。 |
| She looked totally different. | 彼女は、完全に異なるように見えました。 |

(2) EXAMPLE OF DISPLAYING TRANSLATION SIDE BY SIDE WITH THE ORIGINALS EACH IN THE UPPER LINE:

ABC park is located in the center of New York.
ABC公園は、ニューヨークの中心に位置しています。

I met her in the park.
私は、公園で彼女に会いました。

She looked totally different.
彼女は、完全に異なるように見えました。

FIG.3

(1) AN ILLUSTRATIVE SENTENCE:
   I have a pen.

(2) ORIGINAL TEXT BUFFER:

| T | h | i | s | | i | s | | a | | p | e | n | . |

(3) (A PART OF) BUFFER OF RESULT OF LOOKING-UP IN A MORPHOLOGICAL DICTIONARY:

| | | | |
|---|---|---|---|
| this → | PRONOUN | DEMONSTRATIVE PRONOUN | |
| is → | VERB | | |
| a → | INDEFINITE ARTICLE | | |
| pen → | NOUN | | |

(4) BUFFER OF SYNTAX ANALYSIS PROCESSING RESULTS:

(5) BUFFER OF CONVERSION PROCESSING RESULTS:

(6) BUFFER OF GENERATION PROCESSING RESULTS:
   これはペンである。

FIG. 4

(1) AN EXAMPLE OF DICTIONARY FOR MORPHOLOGICAL ANALYSIS PROCESSING:

| WORD | A PART OF SPEECH |
|------|------------------|
| this | PRONOUN |
| is | VERD |
| a | ARTICLE |
| pen | NOUN |

(2) AN EXAMPLE OF DICTIONARY FOR SYNTAX ANALYSIS PROCESSING:

SENTENCE ⟶ SUBJECT, PREDICATE
SUBJECT ⟶ NOUN PHRASE
PREDICATE ⟶ VERB, NOUN PHRASE
NOUN PHRASE ⟶ PRONOUN
NOUN PHRASE ⟶ ARTICLE, PRONOUN (3) AN EXAMPLE OF DICTIONARY FOR CONVERSION PROCESSING:

PREDICATE [VERB, NOUN PHRASE] ⟶ PREDICATE [NOUN PHRASE, VERB]
NOUN PHRASE [ARTICLE, NOUN] ⟶ NOUN PHRASE [NOUN]
VERB PHRASE [VERBE, NOUN] ⟶ VERB PHRASE [NOUN, VERB]

(4) AN EXAMPLE OF DICTIONARY FOR GENERATION PROCESSING:

* (PRONOUN) ⟶ * (PRONOUN) (PARTICLE)
* (NOUN) ⟶ * (NOUN) (PARTICLE)
* (POSSESSIVE PRONOUN) ⟶ * (POSSESSIVE PRONOUN) (PARTICLE)

(1) INPUT TEXT:
    ABC park is located in the center of New York.
    I met her in the park.
    She looked totally different.

(2) AN EXAMPLE OF FORMAT BUFFER BEFORE TAG DESIGNATION BY USER:
    TEXT FORMAT BUFFER
        {RED, GOTHIC TYPE, 10.5}
    TRANSRATION FORMAT BUFFER
        {BLUE, GOTHIC TYPE, 10.5}

(3) AN EXAMPLE OF FORMAT AFTER BEFORE TAG DESIGNATION BY USER:
    TEXT FORMAT BUFFER
        {RED, MING TYPE, 9}
    TRANSRATION FORMAT BUFFER
        {BLUE, MING TYPE, 12}

(4) RESULT OF TRANSLATION PROCESSING:
    ABC 公園は、ニューヨークの中心に位置しています。
    私は、公園で彼女に会いました。
    彼女は、完全に異なるように見えました。

(5) AN EXAMPLE OF OUTPUT BUFFER AFTER TAGGING THE FORMAT OF ONE SENTENCE:
    {RED, MING TYPE, 9 | ABC park is located in the center of New York.}
    {BLUE, MING TYPE, 12 | ABC 公園は、ニューヨークの中心に位置しています。}

(6) AN EXAMPLE OF OUTPUT BUFFER AFTER TAGGING THE FORMAT OF THREE SENTENCE:
    {RED, MING TYPE, 9 | ABC park is located in the center of New York.}
    {BLUE, MING TYPE, 12 | ABC 公園は、ニューヨークの中心に位置しています。}
    {RED, MING TYPE, 9 | I met her in the park.}
    {BLUE, MING TYPE, 12 | 私は、公園で彼女に会いました。}
    {RED, MING TYPE, 9 | She looked totally different.}
    {BLUE, MING TYPE, 12 | 彼女は、完全に異なるように見えました。}

FIG.10

(7) AN EXAMPLE OF DISPLAY:

> ABC park is located in the center of New York.
> ABC 公園は、ニューヨークの中心に位置しています。
>
> I met her in the park.
> 私は、公園で彼女に会いました。
>
> She looked totally different.
> 彼女は、完全に異なるように見えました。

(8) EDITION EXAMPLE 1 (DELETING THE FIRST SENTENCE):

> I met her in the park.
> 私は、公園で彼女に会いました。
>
> She looked totally different.
> 彼女は、完全に異なるように見えました。

(9) EXAMPLE OF OUTPUT BUFFER OF EDITION 1:
    {RED, MING TYPE, 9 | I met her in the park.}
    {BLUE, MING TYPE, 12 | 私は、公園で彼女に会いました。}
    {RED, MING TYPE, 9 | She looked totally different.}
    {BLUE, MING TYPE, 12 | 彼女は、完全に異なるように見えました。}

(10) EDITION EXAMPLE 2 (EDITING THE TRANSLATION AFTER CORRECTION BY EDITION 1):

> I met her in the park.
> 公園で彼女に会いました。
>
> She looked totally different.
> 彼女は、完全に別人のようでした。

(11) EXAMPLE OF OUTPUT BUFFER OF EDITION 2:
    {RED, MING TYPE, 9 | I met her in the park.}
    {BLUE, MING TYPE, 12 | 公園で彼女に会いました。}
    {RED, MING TYPE, 9 | She looked totally different.}
    {BLUE, MING TYPE, 12 | 彼女は、完全に別人のようでした。}

TRANSLATION MACHINE WITH FORMAT CONTROL

BACKGROUND OF THE INVENTION

Recently, many kinds of translating machines using electronic computers have been developed. The resultant translation is displayed usually together with the original text arranged left in one line or arranged in the upper of two lines.

Japanese Laid-Open Patent Publication No. 05-108711 discloses such a proposal that an original text is divided into portions and each portion is displayed as paired with a corresponding translation disposed thereunder to make it easier to understand and edit the translation on a display screen.

In case that an original text and its translation are displayed as arranged left and right respectively in one line on a display screen, they are apart from each other and the translation can not easily read referring to the original sentence. In case that an original text and its translation are displayed as arranged upper and lower respectively in two lines on a display screen, it is difficult to look over the original text only or the translation only.

In the prior art disclosed in Japanese Laid-Open Patent Publication No. 05-108711, the correspondence of an original text to its translation is made on the basis of information on the resultant translation, so that post-edition of the translation, if be made, is accompanied by the necessity to rewriting the resultant information or recording a history of amendments. This may be an additional loss of time and labor.

When one desires to look over a translation only, an original text paring therewith may decrease readability of the translation.

As a translation made by the translating machine necessarily requires post-editing for correcting errors and polishing up the translation to be naturally readable and easier to understand, it is further desired to easily examine the translation by sentence referring to the original text and at the same time to easily follow the translation only.

SUMMARY OF THE INVENTION

The present invention relates to a translating machine for translating an input original text into a translation, and is directed to provide a translating machine capable of presenting an original text and a translation with easy correspondence to each other.

An object of the present invention is to provide a translating machine for translating an input original text into a translation, which is characterized by presetting format information for the input original text and format information for a translation and outputting the original text side by side with the translation according to the preset format information for them.

Another object of the present invention is to provide a translating machine which comprises a text inputting means for inputting an original text, text storage means for storing the original text inputted by the text inputting means, translating means for translating the original text inputted by the text inputting means, translation storage means for storing a translation obtained by the translating means, format information inputting portion for inputting format information for the original text and format information for the translation, format information storage means for storing the format information inputted by the format inputting means for the original text and the translation, synthesized information storing means for reading the original text format information and the translation format information from the format information storage means, adding the original text format information to the original text and the translation format information to the translation and storing a couple of the original text and the translation, and output means for outputting the synthesized information stored in the synthesized information storage means.

A further object of the present invention is to provide a translating machine which is characterized in that the format information is at least one of font color, font type and font size.

PREFERRED EMBODIMENT OF THE INVENTION

Prior to explaining preferred embodiments of the present invention, prior art will be described below as references for the present invention.

Recently, many kinds of translating machines using electronic computers have been developed. The resultant translation is displayed usually together with the original text arranged left in one line as shown in FIG. 1(1) or arranged in the upper of two lines as shown in FIG. 1(2).

Japanese Laid-Open Patent Publication No. 05-108711 discloses such a proposal that an original text is divided into portions and each portion is displayed as paired with a corresponding translation disposed thereunder to make it easier to understand and edit the translation on a display screen.

Figure 1:
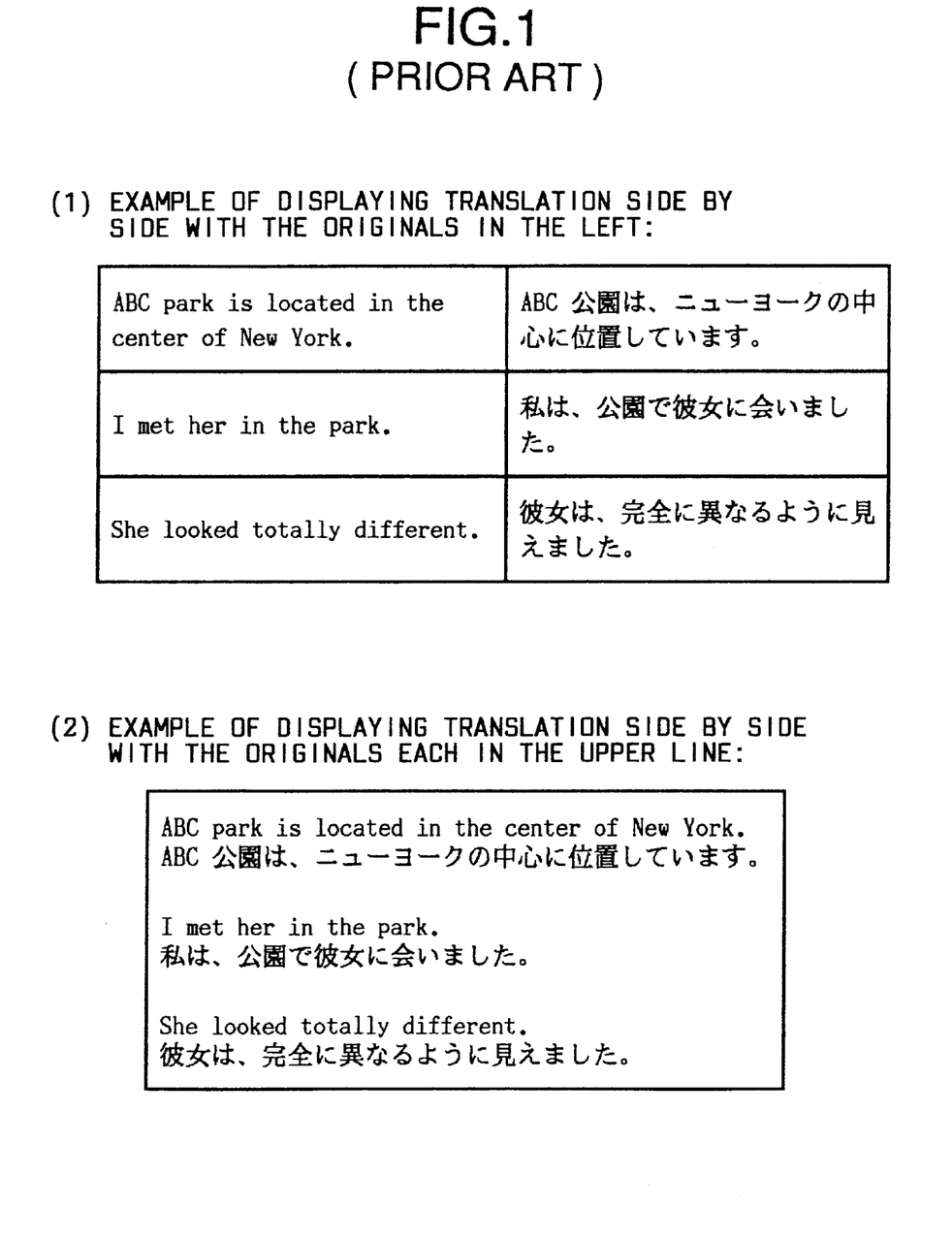
FIG. 1 shows examples of display of a conventional translating machine.

In case that an original text and its translation are displayed as arranged left and right respectively in one line on a display screen as shown in FIG. 1(1), they are apart from each other and the translation can not easily read referring to the original sentence. In case that an original text and its translation are displayed as arranged upper and lower respectively in two lines on a display screen as shown in FIG. 1(2), it is difficult to look over the original text only or the translation only.

In the prior art disclosed in Japanese Laid-Open Patent Publication No. 05-108711, the correspondence of an original text to its translation is made on the basis of information on the resultant translation, so that post-edition of the translation, if be made, is accompanied by the necessity to rewriting the resultant information or recording a history of amendments. This may be an additional loss of time and labor.

When one desires to look over a translation only, an original text paring therewith may decrease readability of the translation.

As a translation made by the translating machine necessarily requires post-editing for correcting errors and polishing up the translation to be naturally readable and easier to understand, it is further desired to easily examine the translation by sentence referring to the original text and at the same time to easily follow the translation only.

Figure 2:
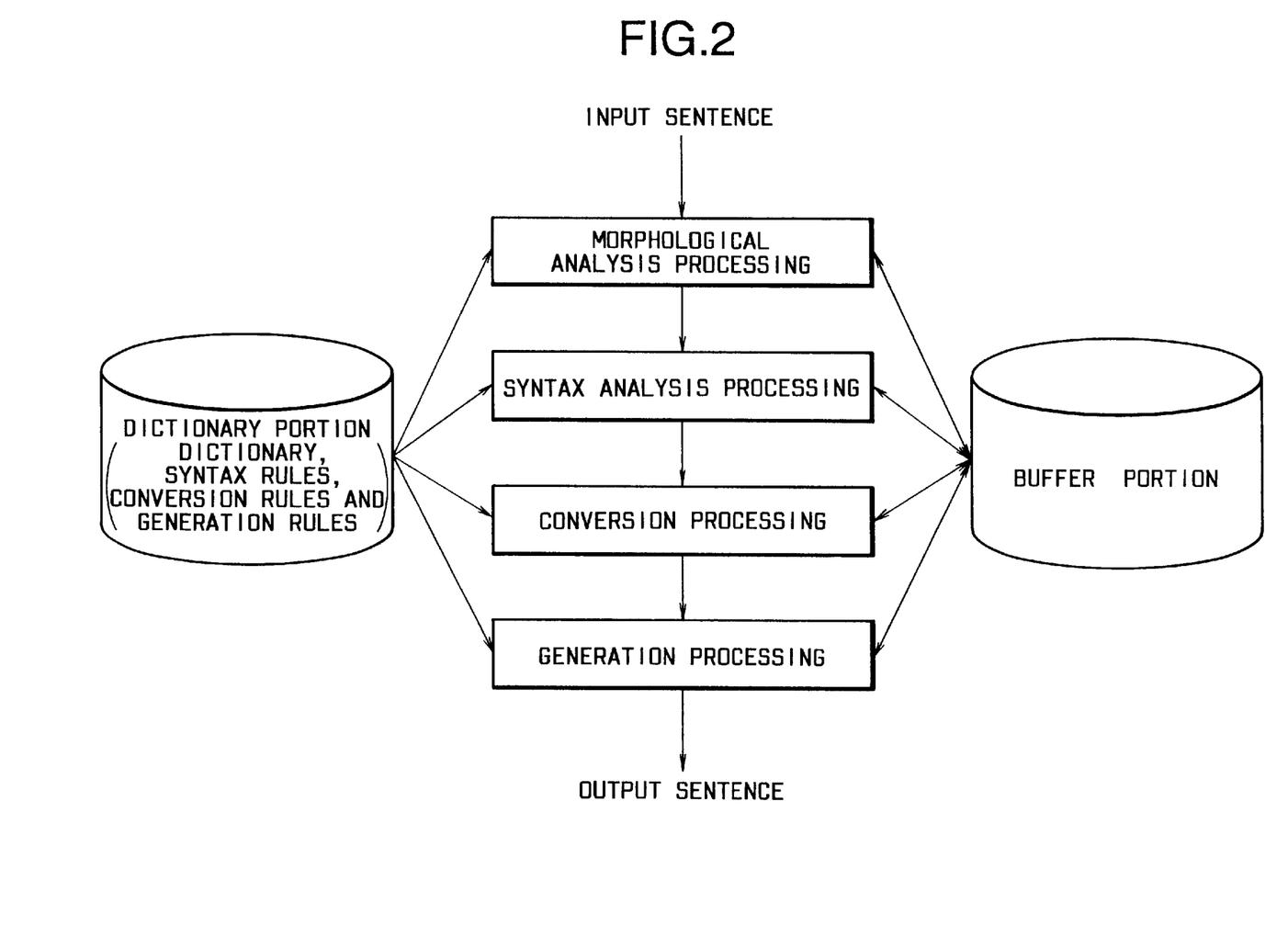
FIG. 2 is a view showing translation processing actions.
Figure 3:
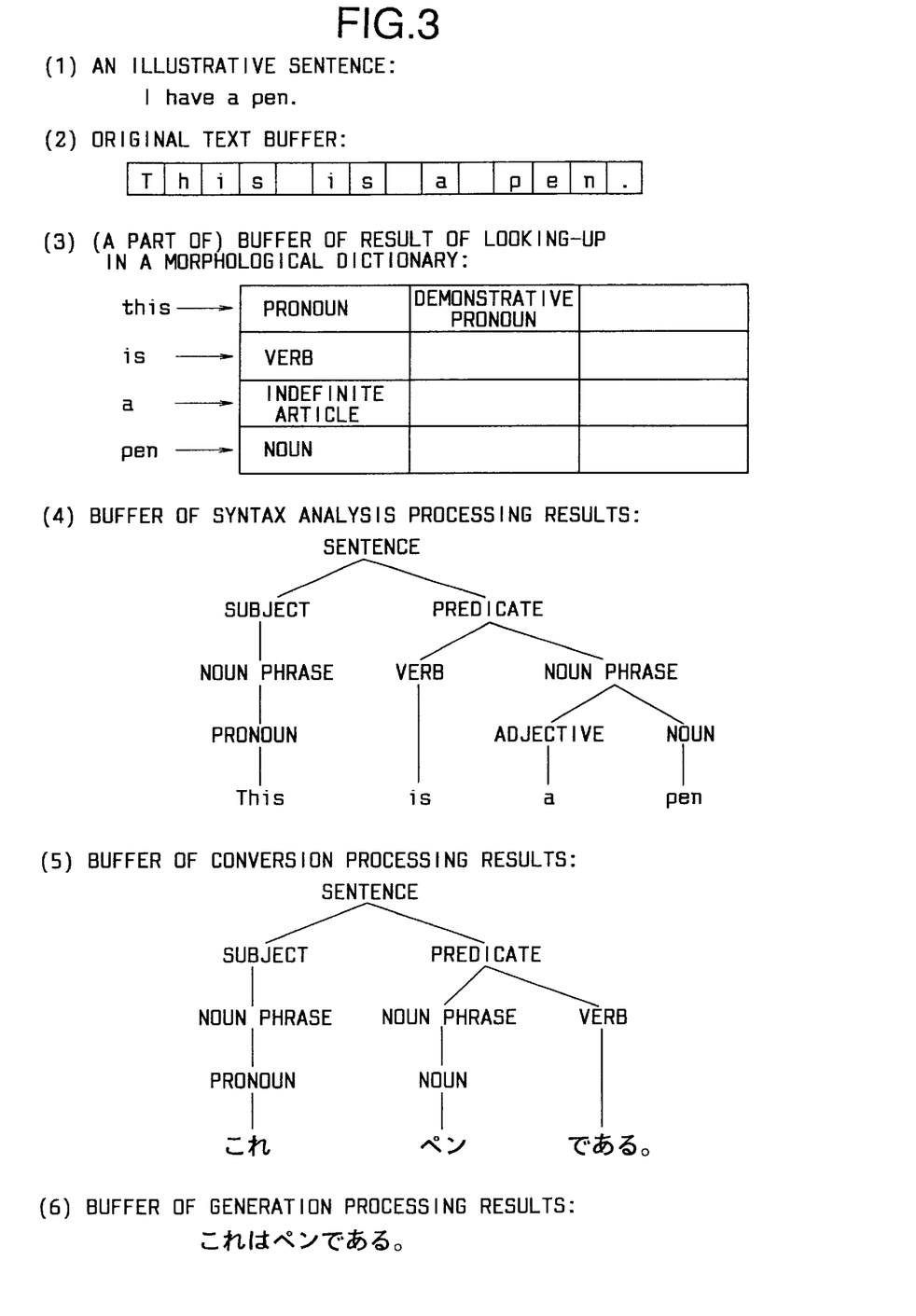
FIG. 3 is a view showing an example of contents of a buffer portion concerning translation processing.
Figure 4:
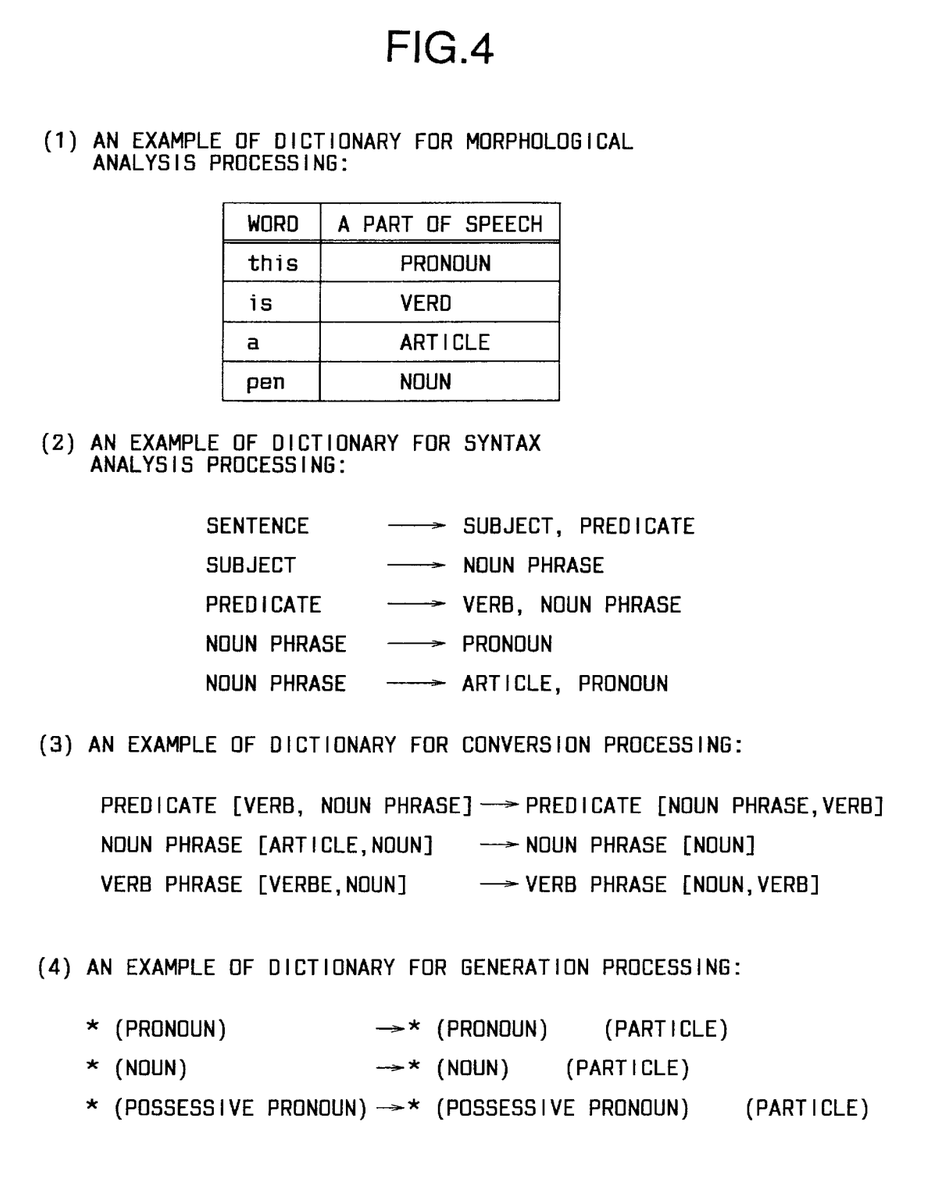
FIG. 4 is a view showing an example of dictionary used for translation processing.

Referring to accompanying drawings, the preferred embodiments of the present invention will be described below in detail. It should be understood that the present invention is not limited to the embodiments except as defined in the appended claims:

First, a general translating process is explained referring to FIGS. 2 to 4. FIG. 2 shows steps of a translating process, which will be explained in turn. In this embodiment, the process of translating an English text into a Japanese by transfer method is taken as a representative example. However, the application of present invention is not limited to the English-Japanese translation and the transfer method.
(1) Morphological Analysis Processing In this processing, each input sentence is decomposed into respective morphemes by, e.g., longest matching method, looking up words starting from the top of the sentence in a dictionary portion wherein morphemes are stored. Syntax information (e.g., part of speech) and translation information (words usable in a translation) for each word found in the dictionary are obtained, then analysis of the sentence is performed as to tense, person, number and so on.
(2) Syntax Analysis Processing This processing puts together words to form a sentence in form of parse tree according to information as to part of speech and form(conjugation, declension, inflection) of words and decides it. In this case, syntax rules selected among a group of syntax rules are applied and syntactic information obtained from a word dictionary is used.
(3) Conversion Processing A parse tree of an input language (e.g., English) is converted into a parse tree of an output language (e.g., Japanese). In this case, syntax rules selected among a group of syntax rules are applied and syntactic information obtained from a word dictionary is used. Generation Processing The parse tree of the output language is converted into a string of Japanese characters and an adequate particle and an auxiliary verb are inserted to generate a sentence in Japanese. In this case, syntax rules selected among a group of syntax rules are applied and generative information (e.g., tense) obtained at the step of morphological analysis.

Referring to FIG. 3 to 4, an example of translating an English sentence [This is a pen] into Japanese is described as follows:

The input original sentence is stored into a text buffer of a buffer portion as shown in FIG. 3(2) and the morphological analysis processing is performed on the input sentence, looking up words starting from the top of the sentence in the dictionary portion shown in FIG. 2. Syntax information (e.g., part of speech) is at the same time added to each word.

FIG. 4(1) shows an exemplified dictionary used for morphological analysis processing and FIG. 3(3) shows the content of the buffer after morphological analysis. The word [This] being of multiple-part-of-speech is decided uniquely at the step of syntactic analysis of a translation program.

The syntax analysis processing decides a parse tree showing relationship between words by using syntax rules stored in the dictionary portion shown in FIG. 2.

FIG. 4(2) shows an example of syntax rules used for syntax analysis processing of the sentence. The parse tree is determined by the shown rules.

FIG. 3(4) shows the content of the buffer after syntax analysis. For example, the syntax rule described by [sentence→subject, predicate]indicates that [a sentence can be composed of a subject and a predictive].

The conversion processing converts a parse tree for input language (e.g., English) shown in FIG. 3(4) into a parse tree for output language (e.g., Japanese) shown in FIG. 3(5) by using translation rules stored in the dictionary portion shown in FIG. 2.

FIG. 4(3) shows an example of translation rules used for translation processing. The translation rule described by (Verb phrase [verb, noun phrase]→verb phrase [noun phrase, verb]) indicates that a verb phrase in English consisting of a verb and a noun phrase in the described order is converted a verb phrase in Japanese consisting of a noun phrase and a verb in the described order.

The generation processing selects applicable rules in a group of generative rules stored in the dictionary portion shown in FIG. 2. In this case, an adequate particle and auxiliary verb is decided and inserted.

FIG. 4(4) shows an example of generative rules used for generation processing and FIG. 3(6) shows the content of the buffer after generation processing. (In the shown case, only the first rule [*(pronoun)→* (pronoun) は (particle)] shown in FIG. 4(4) is applied.)

The shown generative rule [*(pronoun)→* (pronoun) は(particle)] indicates that a particle [は] in Japanese is inserted just after a pronoun.

The resultant translation これはペンである in Japanese is outputted to an output device such as a CRT, printer and so on.

Figure 5:
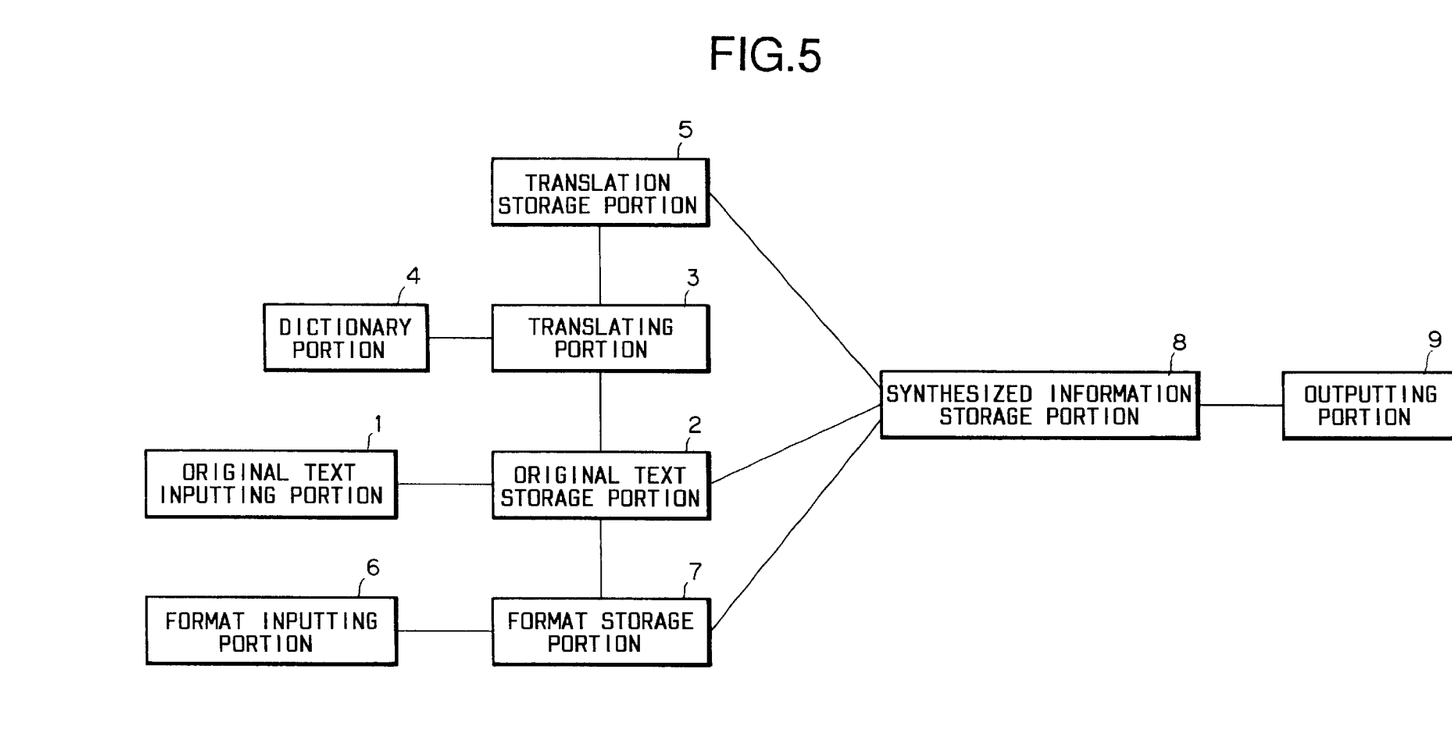
FIG. 5 is a block diagram of a translating machine embodying the present invention.

Referring now to FIGS. 5 to 10, the translation processing system according to the present invention is described as follows: FIG. 5 is a block diagram showing a configuration of a translating machine embodying the present invention.

An original text inputting portion 1 is constructed by a key-board or the like device for inputting an original text and user's instructions. An original text inputted by the original text inputting portion 1 is stored in an original text storage portion (text buffer) 2. A translating portion 3 translates the input original text by referring to a dictionary of the dictionary portion 4. A resultant translation is stored in a translation storage portion (translation buffer) 5.

On the other hand, a format inputting portion 6 inputs a format for the original text and a format for the translation respectively and the inputted formats are stored in a format storage portion (format buffer) 7. Although the shown embodiment uses two separate input portions 1 and 6, it may have an input portion commonly used for inputting original text and formats.

A synthesized information storage portion (output buffer) 8 puts together the original text, the translation and the format information read from the original text storage portion (text buffer) 2, the translation storage portion (translation buffer) 5 and the format storage portion (format buffer) 7 respectively and stores a synthesized result which through an outputting portion 9 is outputted to an external device (not shown) such as a printer, display and external storage.

Figure 6:
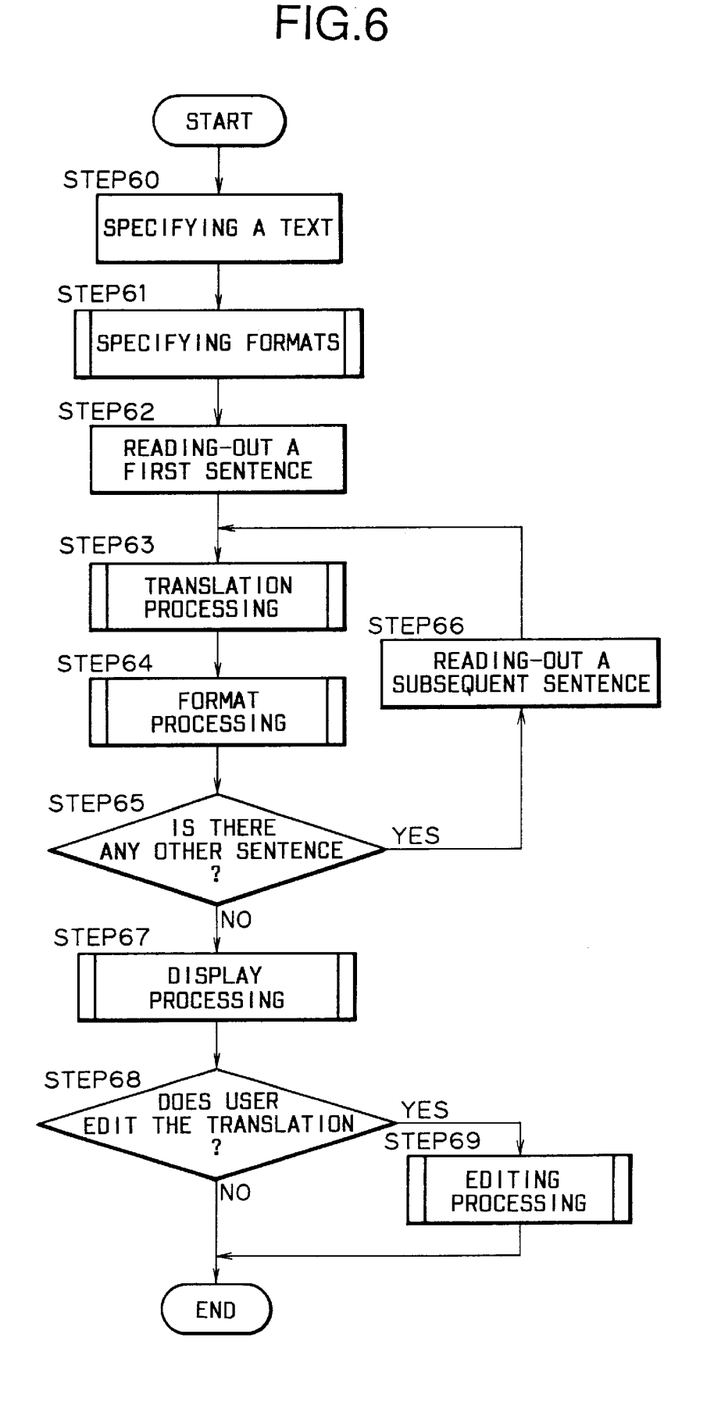
FIG. 6 is a flow chart of translating processing procedure according to the present invention.

Referring to a flow chart shown in FIGS. 6 to 8 and to buffer contents of FIGS. 9 and 10, a practical example of translating process according to the present invention is described in detail as follows:

FIG. 6 is a flow chart showing a procedure of translating processings according to the present invention. A desired one of original texts inputted by the original text inputting portion 1 and stored in the original text storage portion (text buffer) 2 is designated (Step 69). It is also possible to directly input an original text to be translated.

A format for the original text and a format for a translation are inputted from the format inputting portion 6 and designated (Step 61). If no format is designated by the user, the formats preset in the translating machine is applied. The designated or preset format information is stored in the format storage portion (format buffer) 7. The format storage portion (format buffer) 7 holds formats for original text and translation.

A first sentence from the original text is taken read-out (Step 62), which is then translated by the translating portion 3 (Step 63) and a resultant translation is stored in the translation storage portion (translation buffer) 5.

The original text and the translation are given their formats and coupled with each other by the synthesized information storage portion 8 and then stored in the output buffer within the synthesized information storage portion 8 (Step 64).

A next sentence is taken from the original text and processed by repeating the above-mentioned Steps 65 and 66. The processing steps are repeated until the last sentence of the original text is translated and synthesized.

The data from the synthesized information storage portion (output buffer) 8 is outputted by the outputting portion 9 to a display device (Step 67).

The resultant translation displayed on the display screen is post-edited if any mistake is found (Step 68 →Step 69) whereby the translation processing ends.

Figure 7:
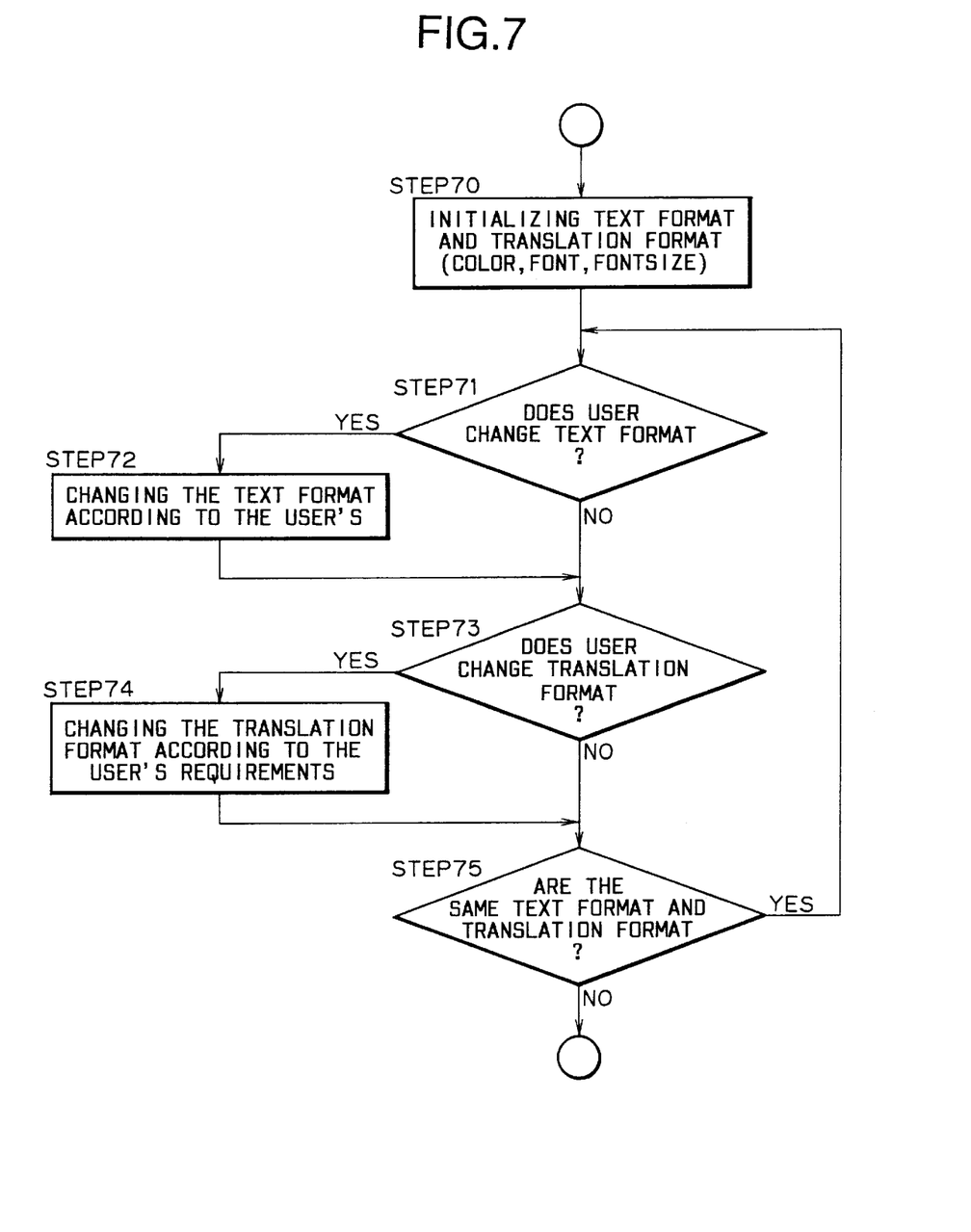
FIG. 7 is a flow chart of format input processing procedure.

FIG. 7 is flow chart of format inputting procedure (Step 61 shown in FIG. 6).

The original text format and the translation format are initialized (Step 70). Although the format of this example consists of color, font type and font size, it may be any other (e.g., of color only or with slant type added) because the format content is not essential for the present invention.

The user is then requested to answer whether he wants to change the format of the original text (Step 71). If so, the format is changed as the user requested and the modified format is stored (Step 72). The similar processing is made as to the format of the translation (Step 73→Step 74).

The format of the original text and the format of the translation are compared with each other (Step 75). If they are the same, the processing returns to Step 71 to change the format. If they are different, the processing ends.

The formats initially set in the translating machine are selected when no request was made by the user.

Figure 8:
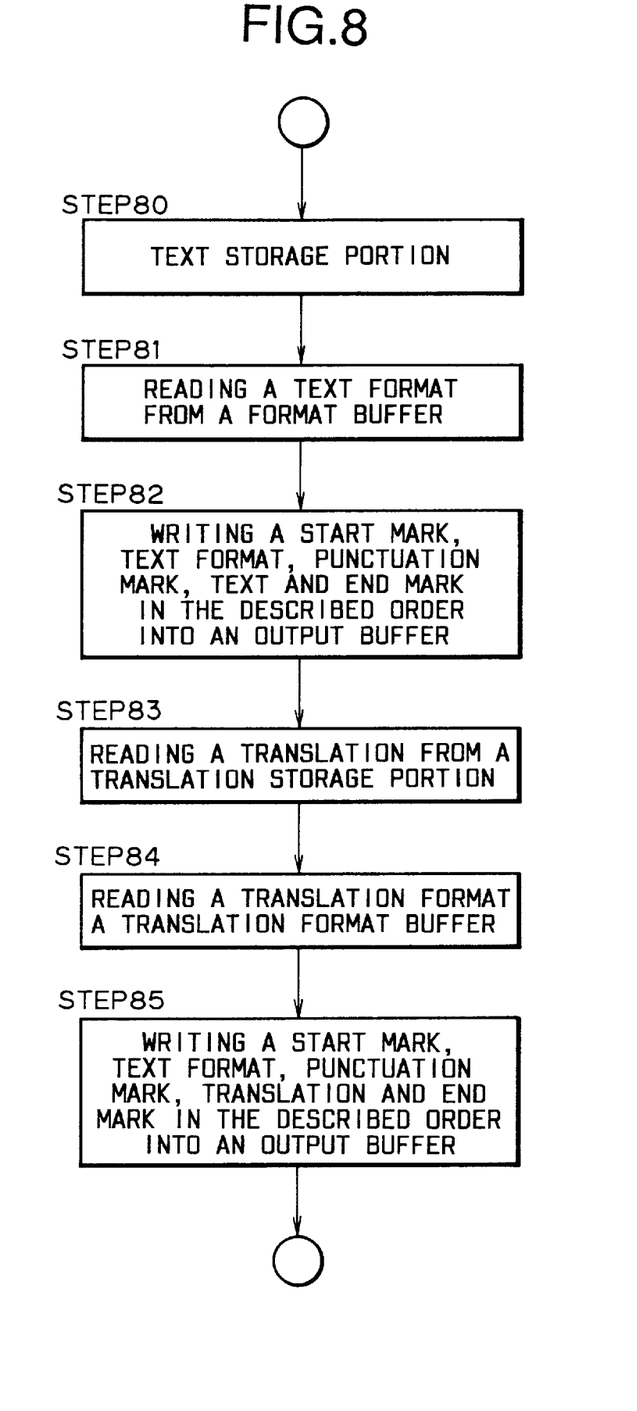
FIG. 8 is a flow chart of formatting processing procedure.

FIG. 8 is a flow chart of format adding procedure (Step 64).

The original text is first taken from the original text storage portion (text buffer) 2 (Step 80) and the original text format is then taken from the format storage portion (format buffer) 7 (Step 81). A string of data consisting of a start mark ("{" in this example), an original text format ("red, ming type, 9" in this example), a punctuation mark ("{" in this example), an original text and an end mark is stored in the output buffer of the synthesized information storage portion 8 (Step 82).

The translation is read from the translation storage portion 5 (Step 83) and the translation format is read from the format storage portion (format buffer) 7 (Step 84). A string of data consisting a start mark ("{" in this example), a translation format tag ("red, ming type, 9" in this example), a punctuation mark ("{" in this example), a translation a nd an end mark is stored in the output buffer of the synthesis storage portion 8 (Step 85).

Figure 9:
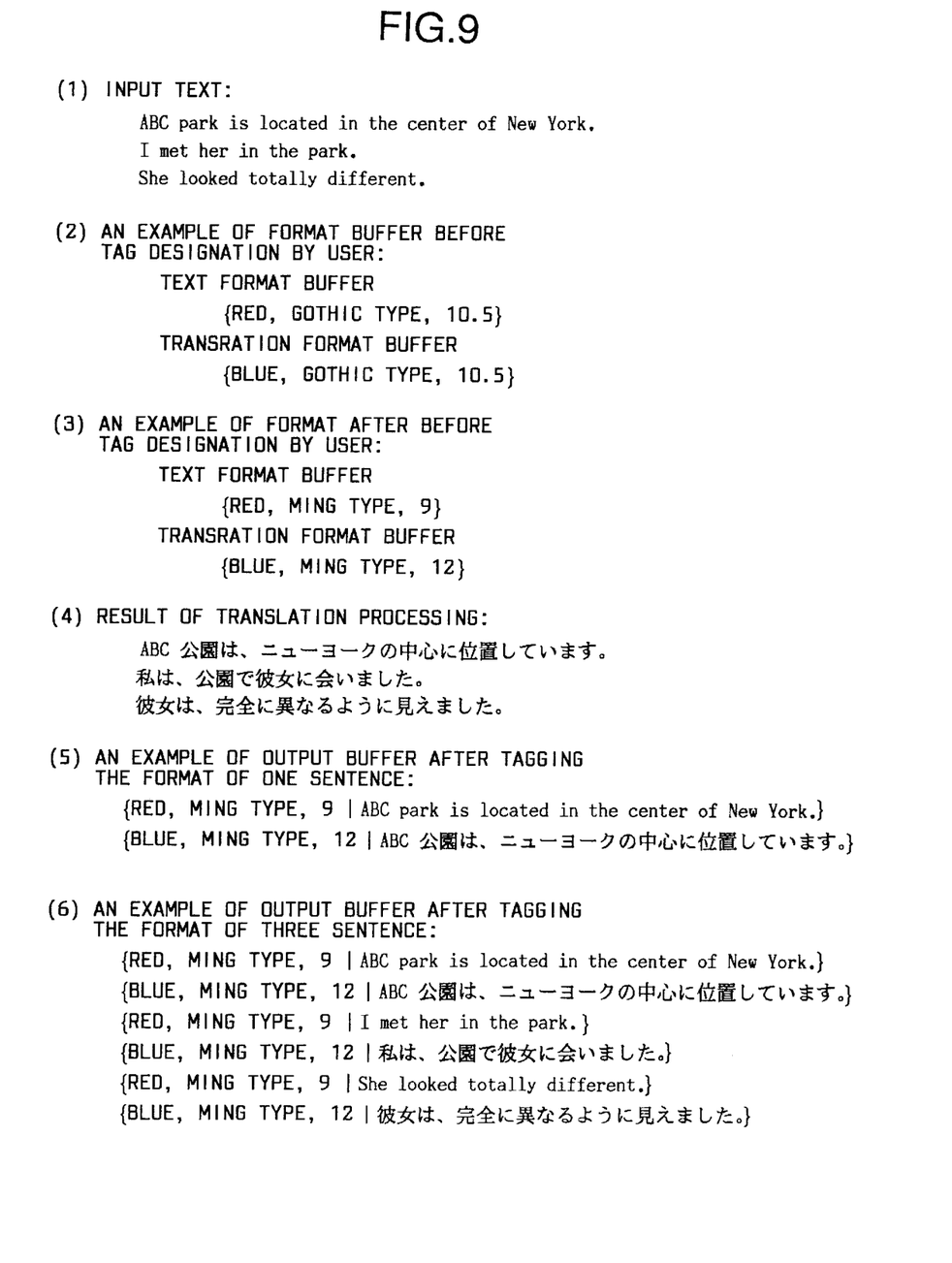
FIG. 9 is illustrative of exemplified contents of storage portions concerning translation processing steps according to the present invention.

FIG. 9(1) shows an exemplified original text stored in the original text storage portion (original text buffer) 2. FIGS. 9(2) and 9 (3) are illustrative of exemplified formats stores in the format storage portion (format buffer) 7. The formats shown in FIG. 9(2) are those initially set in a translating machine according to the present invention. These formats are added to an original text and a translation if no modification is inputted by a user. The formats shown in FIG. 9(3) are those inputted by the user. FIG. 9(4) shows an exemplified translation stored in the translation storage portion (translation buffer) 5.

FIGS. 9(5) and (6) show examples of data each including format data plus an original text and format data plus a translation, which are stored in the output buffer of the synthesized information storage portion 8. As seen from FIG. 9(6), each of the original sentences is correlated with its translation. FIG. 10(7) illustrative of data displayed on a display when the content of the output buffer of FIG. 9(6) is outputted through the outputting portion 9 to the display.

Figure 10:
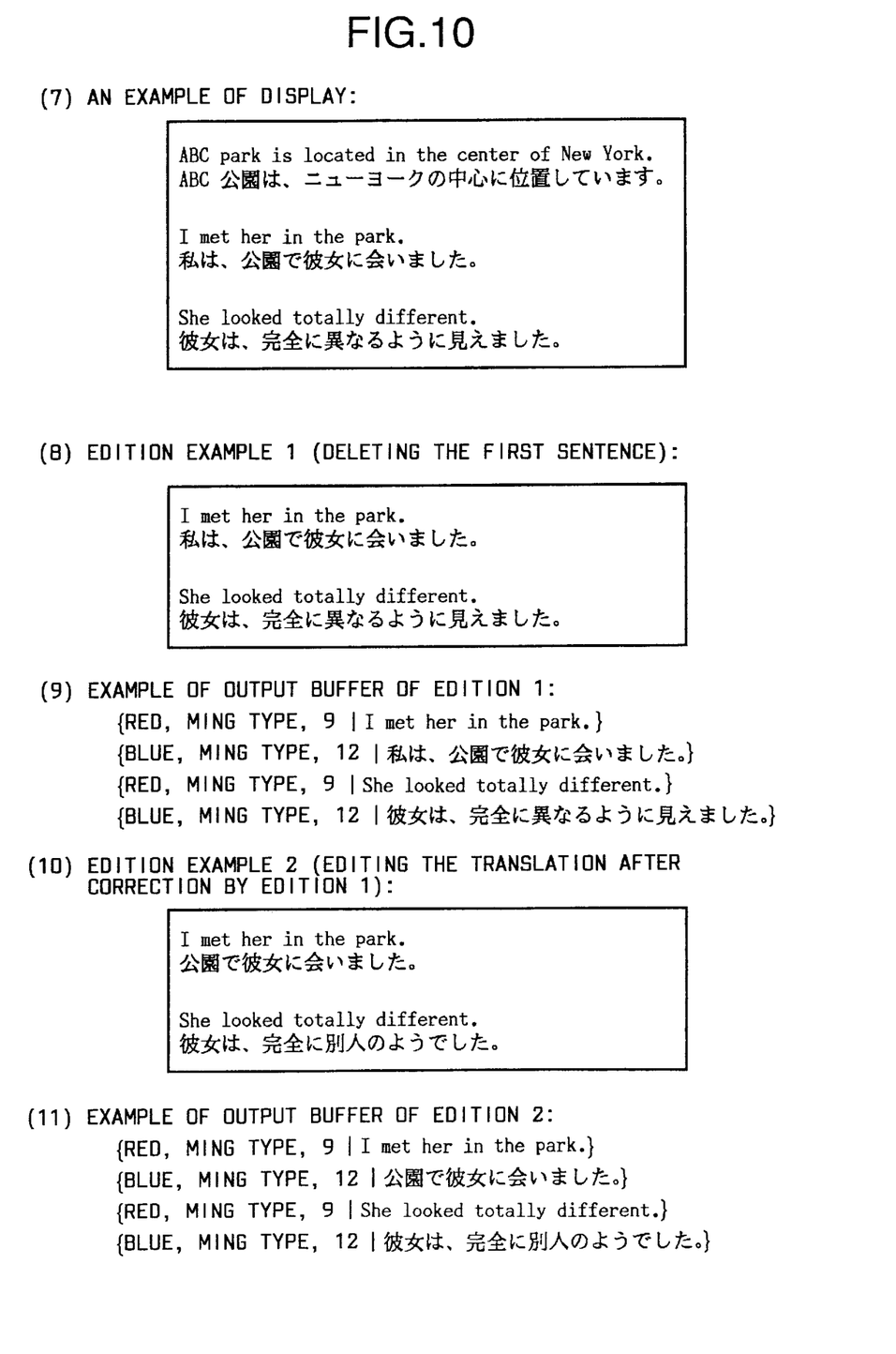
FIG. 10 is illustrative of exemplified contents of storage portions concerning translation processing steps according to the present invention.

FIG. 10(8) shows an example of data represented on a display screen when the user edited the data representation of FIG. 10(7) by deleting therefrom a first pair of original and translation sentences. FIG. 10(9) shows an example of post-edited data stored in the output buffer.

FIG. 10(10) shows a re-edited representation on a display screen when the user edited the translation in the representation on the display screen shown in FIG. 10(8). FIG. 10(11) shows an example of the re-edited data stored in the output buffer.

Although the translating processing and the formatting processing were conducted separately in the described example, the formatting processing can be included in the translating procedure.

Although no description is given in this example, it is also possible to extract only an original text or a translation by using a corresponding format as a key. The provision of this function enables the translating system to easily elaborate a translation in such a manner that the original text is corrected by the user referring its resultant translation and then only the corrected text is extracted and translated. It becomes also possible to easily reuse a stored translation by extracting the translation only and recast it.

According to one of the present invention, a translating machine for translating an input original text can be given the facility of separately setting a format of the original text and a format of the translation and outputting the original text and the translation, which are intercorrelated according to their format information. This makes it easier to read the translation with reference to the original text.

According to another one of the present invention, it is possible to provide a translating machine wherein an original text inputted by text inputting means is stored in text storage means and translated and a resultant translation is stored in a translation storage means; format information for the original text and format information for the translation are inputted by format inputting means and then stored in format information storage means; the format information of the original text and the format information of the translation are added to the original text and the translation respectively and then stored in intercorrelated form in the synthesized information storage portion; and the synthesized information stored in the synthesized information storage means is outputted by outputting means. Because the original text and the translation are given respectively preset formats and correlated with each other by the format information for them to be then outputted, the translation can be easily read with referring to the original text. Furthermore, it is possible to store in one storage the original text and the translation since they are provided with their format information inter-correlating them. This also makes it easier to do post-edition of the translation.

According to another one of the present invention, the original text and the translation can be visually distinguished from each other since the format information for them includes at least one distinguishing element of character color, style and size. This facilitates post-editing processing and like works.

I claim:

1. A translating machine comprising:

original text inputting means for inputting an original text;

original text storage means for storing the original text inputted by the original text inputting means;

translating means for translating the original text inputted by the original text inputting means;

translation storage means for storing a translation obtained by the translating means;

format information inputting means for inputting format information for the original text and format information for the translation;

format information storage means for storing the format information inputted by the format information inputting means for the original text and the translation;

synthesized information storage means for reading the original text format information and the translation format information from the format information storage means, adding the original text format information to the original text and the translation format information to the translation and storing a couple of the original text and the translation; and outputting means for outputting the synthesized information stored in the synthesized information stored in the synthesized information storage means; and means for displaying a single sentence of the original text directly above or below a translation of the single sentence of the text on a display.

2. A translating machine as defined in claim 1, wherein the format information includes at least one of font color, font type and font size.

3. A translating machine as defined in claim 1, wherein the format information inputting means includes means for inputting by a user.

4. A translating machine as defined in claim 1, wherein the format information inputting means includes means for presetting a format in the translation means.

5. A translating machine as defined in claim 3, wherein the format information includes at least one of font color, font type and font size.

6. A translating machine as defined in claim 4, wherein the format information includes at least one of font color, font type and font size.

7. The translating machine as defined in claim 1, wherein the format information means includes two separate portions, a first of said portions associated with the original text a second portion associated with the translation.

8. The translating machine as defined in claim 1, wherein the format information means is a single unit.

* * * * *